UNITED STATES PATENT OFFICE.

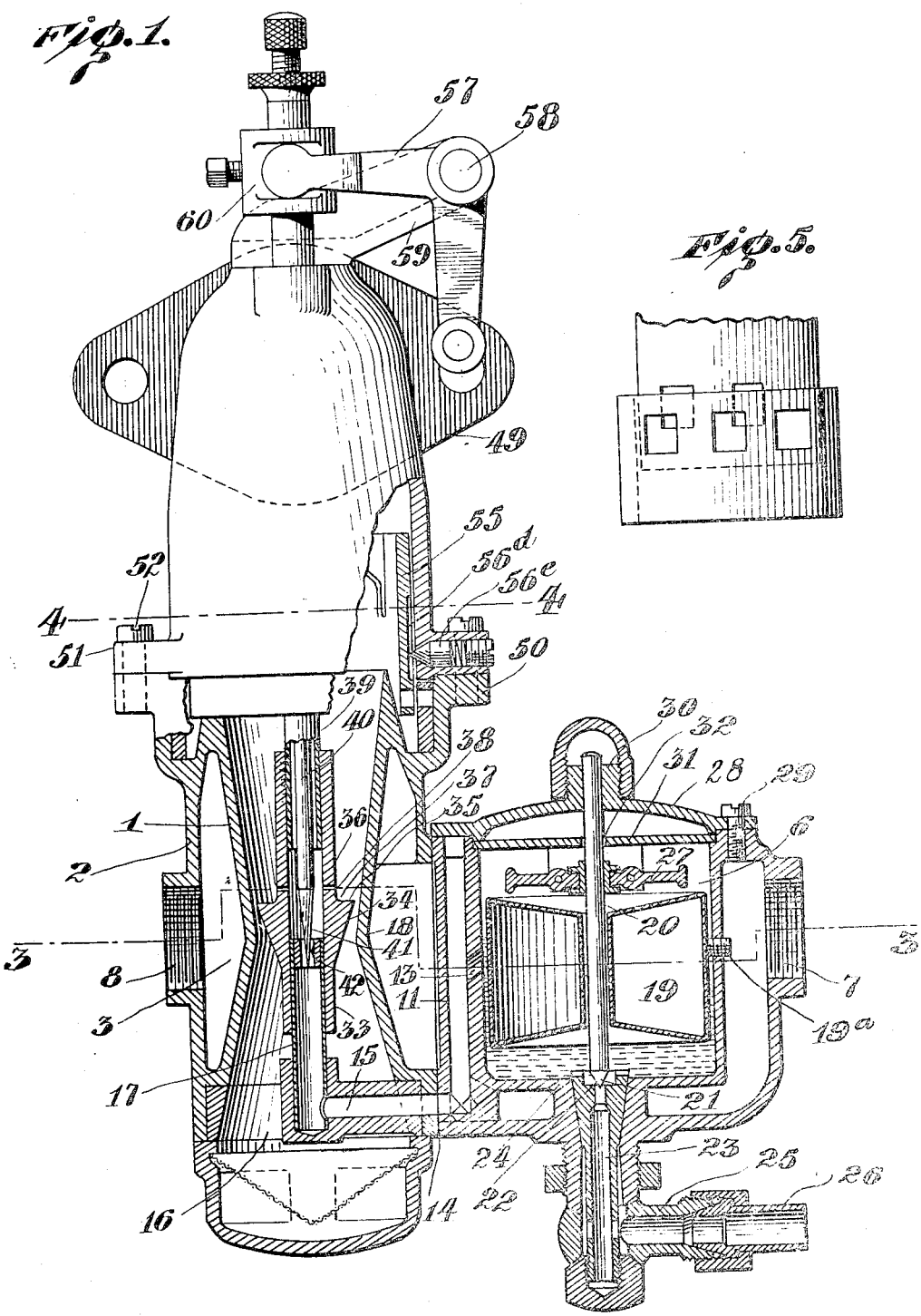

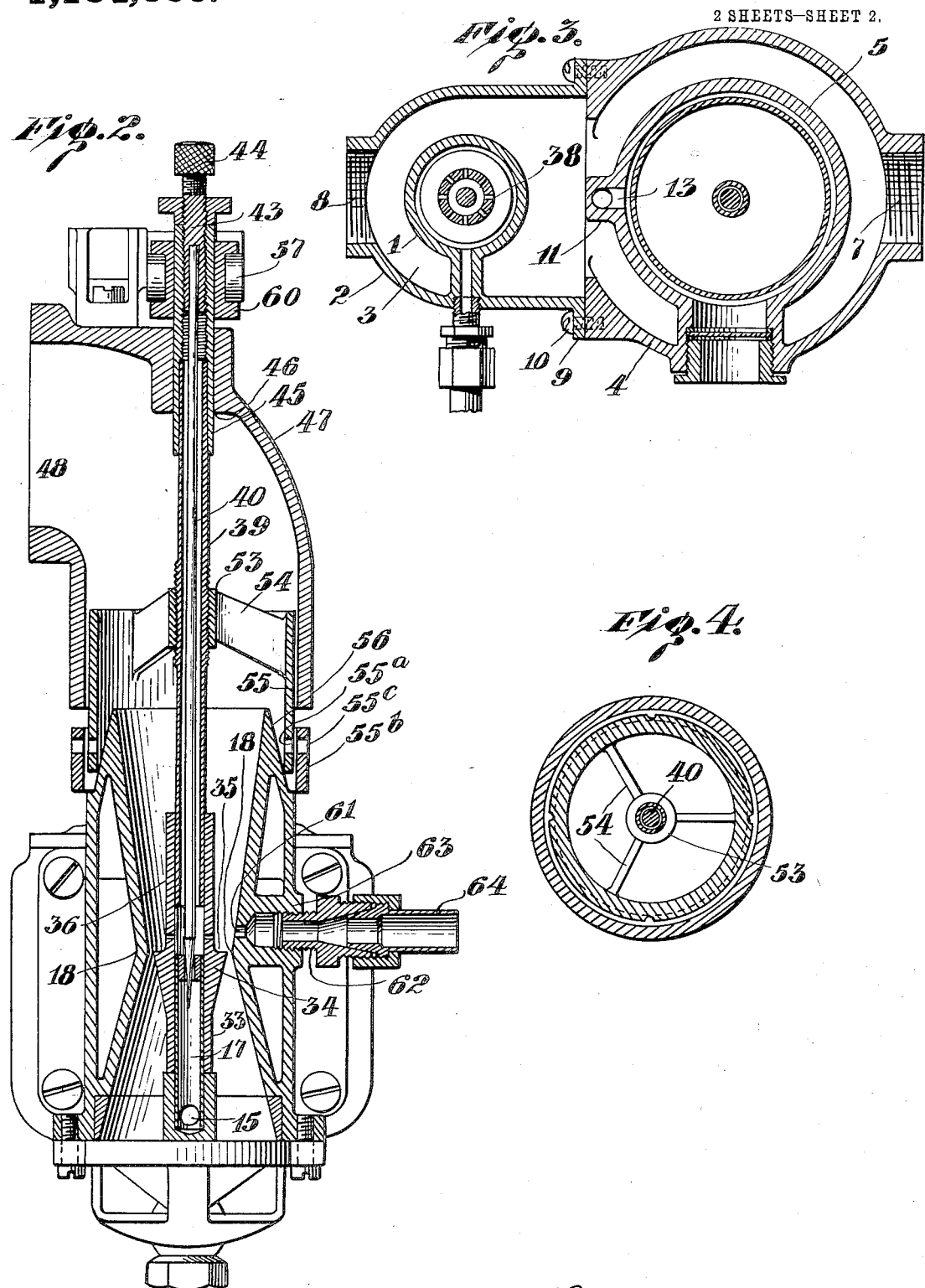

LLEWELLYN T. BARNES, OF SEA CLIFF, NEW YORK.

CARBURETER.

1,134,366. Specification of Letters Patent. Patented Apr. 6, 1915.

Application filed June 2, 1914. Serial No. 842,465.

*To all whom it may concern:*

Be it known that I, LLEWELLYN T. BARNES, a citizen of the United States, and resident of Sea Cliff, in the county of Nassau and State of New York, have invented certain new and useful Improvements in Carbureters, of which the following is a specification.

This invention relates to carbureters for use with internal combustion motors, and my improvements are particularly directed to the provision of novel means whereby fuel, like kerosene and alcohol, which require the presence of a certain degree of heat for their proper vaporization, may be rendered capable of efficiently blending with the air necessary in the creation of a combustible mixture.

A further provision in my invention is for means whereby the vaporized fuel, at the point whence it is aspirated into the mixing chamber of the carbureter is subjected to suction by the passing air under the maximum velocity thereof and in the maximum heat zone of the carbureter.

A still further provision in my invention comprises means whereby is avoided the usual deleterious action of air passing across fuel orifices, which in entraining fuel therefrom, also retards that free fuel flow which is desirable in the efficient employment of the carbureter capacity in both fuel and air.

With these and other objects in view, my invention consists of a carbureter having a Venturi air supply tube, a fuel supply nozzle axially and adjustably arranged within said Venturi tube, fuel orifices in said nozzle sheltered from impingement thereon by the air passing thereover, the shelter forming a pocket which in the operation of the carbureter constitutes a vacuum chamber to induce a free emission of fuel from the orifices for commingling with the air.

The needle valve that controls the fuel nozzle has a stem, and an auxiliary air valve carried by a sleeve on said stem is adjustable with said needle valve to proportionately regulate the gas mixture and auxiliary air supplied, said auxiliary air valve also having means of adjustment in variable ratios. The float chamber is attached alongside the Venturi tube and both said float chamber and Venturi tube are surrounded by a jacket inclosing a communicating passage which is included in the path of the hot exhaust, whereby the liquid fuel rising in the float chamber, and centrally displaced by the float therein is thereby presented in a thin hollow column against the heated wall of the float chamber. Further the communicating orifice through which the heated fuel passes from the float chamber lies in a vertical position in the float chamber wall where it is in the horizontal plane of both inlet and outlet by which the hot exhaust is conducted through the carbureter jacket, which comprises the zone of maximum heat service. Also the initial mixing point of fuel and air in the Venturi tube, occurring in the throat or constricted portion of said tube, also lies in said horizontal plane of maximum heat service, the temperature efficiency around said initial mixing point being additionally enhanced because the Venturi conformation there provides the maximum clearance between its exterior surface and the surrounding jacket.

Other objects and features of my improvements will appear in the following description.

In the drawings: Figure 1 is a front elevation partly in section, of my improved carbureter. Fig. 2 is a side sectional view thereof. Fig. 3 is a cross section on the line, 3—3 of Fig. 1. Fig. 4 is a cross section on the line 4—4 of Fig. 1, and Fig. 5 is a detail of the auxiliary air valve, with adjustment in variable ratios.

In carrying out my invention I employ a Venturi or constricted tube 1, arranged vertically and having a wall 2 which nearly surrounds said tube, forming a jacket inclosing a heating chamber 3, said wall 2, where it is non-inclosing, being adapted to connect with a wall or jacket 4 that correspondingly nearly surrounds the wall 5 of a float chamber 6. Thus the jackets 4 and 2 between them entirely surround the Venturi tube and float chamber, and they are provided, respectively, with an inlet 7 and outlet 8 adapted to be included in the path of hot gases from the exhaust. The Venturi tube and float chamber may be arranged side by side as seen and connected together as by flanges 9 with bolts 10, so that the inlet 7 and outlet 8 for the heating passage surrounding them may lie opposed in the same horizontal plane. A hollow enlargement or duct 11 extends upwardly from the base of the float chamber outside the wall 5 thereof, centrally of that portion of heating chamber 3 where it connects with side heat chamber surrounding the Venturi tube, whereby it is enveloped by the hot products of combustion passing from inlet 7 to an outlet 8. The fuel from the float chamber 6 enters said hollow enlargement through an orifice 13, located at a certain height in wall 5 below the upper surface of the liquid fuel rising in said float chamber, and a fuel exit 14 in enlargement 11, at the base thereof, communicates with a duct 15, which extends across the mouth 16 of the Venturi tube to the center thereof, there connecting with a vertical fuel supply pipe 17 that rises axially to the constricted portion or neck 18 of the Venturi tube.

Float chamber 6 is provided with a float 19 slidable on a vertical valve stem 20 having needle valve 21 to engage with a seat 22 in a hollow vertical post 23 entered in the base 24 of the float chamber, and having a branch 25 for connecting with a fuel feed pipe 26. Stem 20 carries the pivotal weighted arms 27 which lie upon the upper surface of the float, and which hold the needle valve 21 to its seat until pressure from the feed pipe displaces said valve and admits liquid fuel, said arms in their extended position limiting the buoyant rise of said float, thereby causing the fuel to rise between the float periphery and the wall of the float chamber in a thin annular column which is thus thoroughly heated by the heating jacket. The float chamber is provided with a cover 28, secured thereto as by screws 29 and having a central guideway 30 for stem 20, a disk 31 lying across the top of the valve chamber, beneath said cover, to carry the arms 27, said disk having an aperture 32 for the passage of stem 20. Slidable upon the fuel supply pipe 17 is a nozzle member 33 having an upwardly and outwardly inclined concentric enlargement 34 which at the point of its maximum circumference lies normally in the transverse plane of the constricted portion 18 of the Venturi tube. An annular shoulder 35 forms the upper surface of enlargement 34 and is arranged substantially at right angles to the tubular portion 36 of nozzle member 33, thereby providing an annular clearance or pocket 37 which will not be entered by air passing under the influence of suction force upwardly through the Venturi neck over enlargement 34. The tubular portion 36, just in advance of shoulder 35, is provided with radial orifices 38, which are thus within said clearance or pocket 37 and removed from impinging or entraining contact by the passing air and are free to emit fuel from the nozzle under the influence of the partial vacuum created in said pocket in the rush of air thereover. A sleeve 39 is fast to said nozzle 33 and carries therein a valve stem 40 with needle valve 41 operating in a seat 42 in supply pipe 17 to regulate the fuel supply to the nozzle, said valve being adjustable by a threaded piece 43 having a knurled head 44. Said sleeve 39 and threaded piece 43 are held in a tube 45 which is slidably adjustable in an aperture 46 through the upper casing portion 47 of the carbureter, which is provided with the lateral outlet 48 and surrounding flange 49 by which the carbureter is connected to the engine intake or manifold. Brackets 50 extending from the lower or Venturi portion of the carbureter are adapted to seat lugs 51 on the upper casing portion 47 and to be secured thereto as by screws 52 to thereby connect those parts. Threaded upon sleeve 39, to be vertically adjustable thereon, is a hub 53 having radial arms forming a spider 54 carrying a cylindrical valve 55 with ports 55$^a$, concentric with and lying outside the exterior conoidal surface 56 of the upper portion of Venturi tube 1, and surrounded by a rotatable ring 55$^b$ with ports 56$^c$, for the intake of auxiliary air in quantities regulated by the degree of adjustment of said valve 55 relatively to said ring. The interior surface of casing 47 is cylindrical and concentric with valve 55, a slight clearance existing between said members 47 and 55 whereby a small quantity of air may pass for light running of the engine as with gasolene priming, when the ports 55$^a$ of the valve 55 are closed. When the needle valve 41 and cylindrical valve 55 are suitably adjusted, axial movement of the sleeve 39 will proportionately regulate the supply of fuel from fuel pipe 17, air for mixture therewith through the neck of the Venturi tubes and also the supply of auxiliary air through valve 55. The valve 55 has vertical grooves 56$^d$ with which the point of a set screw 56$^e$ that is passed through casing 47, may engage to hold said valve in a set rotated position in order that its movement in conjunction with needle valve and nozzle portion may be only in a vertical direction, to proportionately vary the quantity of auxiliary air supplied. In this vertical movement the ports 55$^a$ and 55$^c$ register to a desired vertical extent to open port areas according to the degree of opening allowed in said ports by the annular adjustment of ring 55$^b$, said ring being turned by hand to provide a variable port area for the auxiliary air supply. A bell-crank-lever 57, fulcrumed at 58 on an extension 59 of casing 47, engages with a bearing portion 60 on threaded piece 43, said lever having a suitable connection whereby it may be manipulated to regulate the fuel and air supplies.

At 61 is shown an orifice through the wall of the Venturi tube in the region of the initial mixing chamber thereof for a priming supply of gasolene in starting the engine, a nozzle 62 being threaded through a boss 63 formed therefor through jacket 2 and chamber 3 for communication with a gasolene feed pipe 64.

Obviously the float 19 in chamber 6 may be supported in an adjusted position within said chamber, as by a set screw 19ª, in which position the valve to said chamber is open as for a pressure supply of fuel, the float in such instance serving as a fuel displacement member centrally with chamber 6 to present the fuel therein in a thin head or hollow column against heating surface of the surrounding jacket. It is also equally obvious that instead of heating the float or displacement chamber and the chamber around the Venturi tube from the engine exhaust, connection may instead be made with the engine circulatory system.

The bell-crank lever 57 is intended for use as a throttle lever and may be operated in the usual manner by suitable connections for automatic or manual control, for the purpose of regulating simultaneously the fuel supply, the main air supply, and the auxiliary air supply, the adjustment of these several supplies being performed in the axial movement of the sleeve 39, whereby the needle valve carried thereby is controlled through the engagement of lever 57 with the bearing portion 60 that is connected with said sleeve 39; the nozzle 36 carried by said sleeve at the same time regulating by said sleeve the main air supply through the coöperation of its shoulder 35 with the constricted portion of the Venturi, and the annular valve 55 operating therewith to regulate the auxiliary air admission because of its connection with said sleeve 39.

Other variations may be made within the spirit and scope of my invention, and parts thereof may be used without others.

I claim:—

1. A carbureter having a fuel chamber, central fuel displacing means therein, a fuel and air mixing chamber, a duct lying vertically between the fuel chamber and mixing chamber in communication with said fuel chamber at a point near the upper level of the fuel, and leading from its lower end to the mixing chamber, and a single heating jacket enveloping said fuel chamber, vertical duct and mixing chamber in the same horizontal zone.

2. A carbureter having a fuel chamber, central fuel displacing means therein to provide a thin annular fuel head, a vertical hollow enlargement at one side of said fuel chamber, with a communicating orifice near the upper fuel level, a fuel inlet in the base of said chamber, a heating jacket forming a chamber around said fuel chamber and hollow enlargement, a mixing chamber alongside said fuel chamber in the same horizontal zone therewith, and in communication with the hollow portion of said hollow enlargement, said mixing chamber being also surrounded by said heating jacket, and said jacket having oppositely arranged inlet and outlet openings, whereby a heat medium passing therethrough will envelop said fuel chamber, hollow enlargement and mixing chamber.

3. A carbureter having a fuel chamber, central fuel displacing means therein to provide a thin annular fuel head, a Venturi tube adjacent said chamber with its constricted portion in the same horizontal zone therewith, a vertical duct between said fuel chamber and said Venturi tube, said duct receiving fuel from near the upper level thereof in said chamber and delivering it to the constricted portion of said Venturi tube to mix with air passing therethrough, and a heating jacket surrounding said fuel chamber, vertical duct and Venturi tube.

4. A carbureter having a Venturi air supply tube, a fuel pipe therein, a nozzle for said pipe adjustable within the constricted portion of said supply tube, to regulate the main air supply, an upper casing, a valve stem connected to said casing, said stem carrying a needle valve for said fuel pipe and also carrying said nozzle, and an annular valve carried by said stem for the proportionate supply of auxiliary air.

5. A carbureter having a Venturi air supply tube, a fuel pipe therein, a nozzle for said pipe adjustable within the constricted portion of said supply tube, to regulate the main air supply, an upper casing, a valve stem connected to said casing, said stem carrying a needle valve for said fuel pipe and also carrying said nozzle, an annular valve carried by said stem for the proportionate supply of auxiliary air, and a throttle lever to operate said stem whereby the fuel, main air and auxiliary air are all controlled.

6. In a carbureter, a stationary fuel and air mixing chamber comprising a Venturi tube, a fuel supply pipe having a seat, a needle valve therein, a nozzle with means adjustable relatively to the constricted portion of said Venturi tube to regulate the supply of air therethrough, a valve stem, movable means supporting said valve stem and nozzle for adjustment together, and an auxiliary air valve also carried by said supporting means for proportionate adjustment with said valve and nozzle.

7. In a carbureter comprising a vertically arranged Venturi tube for the upward passage of air, a tubular fuel nozzle adjustable axially within the constricted portion of said tube, said nozzle having radial orifices, and an annular shoulder upon said nozzle, below said orifices, to vary the extent of the air passage in the movement of said nozzle, said shoulder, during the passage of air, providing an area of diminished pressure for said orifices to permit unretarded fuel emission therefrom.

8. In a carbureter comprising a Venturi tube for the passage of air, a tubular fuel nozzle adjustable axially within the constricted portion of said tube, said nozzle having radial orifices, and an annular shoulder upon said nozzle arranged at one side of said orifices to shelter them, and to vary the extent of the air passage in the movement of said nozzle, said shoulder, during the passage of air through the tube, thereby providing an area of diminished pressure about said orifices to permit unretarded fuel emission therefrom.

Signed at Sea Cliff in the county of Nassau and State of New York this 27th day of May A. D. 1914.

LLEWELLYN T. BARNES.

Witnesses:
 HENRIETTA E. STOCKMAN,
 F. W. BARKER.